United States Patent
Carlsson et al.

[11] Patent Number: 6,167,240
[45] Date of Patent: Dec. 26, 2000

[54] SYSTEM AND METHOD RELATING TO CELLULAR COMMUNICATION SYSTEMS

[75] Inventors: Roland Carlsson, Partille; Torbjörn Karlsson, Lindome, both of Sweden

[73] Assignee: Telefonaktiebolaget LM Ericsson, Stockholm, Sweden

[21] Appl. No.: 09/087,249

[22] Filed: May 29, 1998

[30] Foreign Application Priority Data

May 30, 1997 [SE] Sweden ................................ 9702046

[51] Int. Cl.[7] .................................................. H04B 17/00
[52] U.S. Cl. ........................ 455/67.3; 455/501; 455/525
[58] Field of Search .................................. 455/422, 423, 455/426, 501, 525, 63, 67.1, 67.3, 434, 436, 439; 370/335, 342, 441; 375/346, 349

[56] References Cited

U.S. PATENT DOCUMENTS

| | | |
|---|---|---|
| 4,670,906 | 6/1987 | Thro . |
| 4,926,421 | 5/1990 | Kawano et al. ........................ 370/335 |
| 5,265,119 | 11/1993 | Gilhousen et al. . |
| 5,276,911 | 1/1994 | Levine et al. ........................... 455/53.1 |
| 5,430,889 | 7/1995 | Hulbert et al. . |
| 5,799,004 | 8/1998 | Keskitalo et al. ........................ 370/335 |
| 5,862,124 | 1/1999 | Hottinen et al. ......................... 370/335 |

FOREIGN PATENT DOCUMENTS

0 782 361  7/1997  European Pat. Off. .

*Primary Examiner*—Edward F. Urban
*Assistant Examiner*—Conguan Tran
*Attorney, Agent, or Firm*—Burns, Doane, Swecker & Mathis, L.L.P.

[57] ABSTRACT

A system and a method reduce interference in a cellular communication system including at least one controlling arrangement communicating with a number of base stations, each of which serves a cell, and a number of mobile stations controlled by the base stations. Each base station includes a detecting device for detecting interfering signals from one or more mobile stations controlled by other base stations. The base stations also include an alarm activating device for activating the transmission of an alarm signal if interference is detected. The controlling arrangement includes a device for requesting identification of all mobile station in the neighborhood of the interfered base station. A device is also provided for establishing by which base station an interfering mobile station is controlled, and the base station controlling the interfering mobile station takes the appropriate action to reduce the interference level.

26 Claims, 8 Drawing Sheets

SYSTEM AND METHOD RELATING TO CELLULAR COMMUNICATION SYSTEMS

BACKGROUND

The present invention relates to a system and a method respectively for reducing interference in cellular communication systems, particularly systems using Code Division Multiple Access (CDMA). The invention also relates to a cellular communication system implementing such a method.

In a cellular communication system each cell is served by a base station controlling the mobile stations within the respective cell. In a CDMA-system all users use the same frequency, i.e. all users can use the whole bandwidth and time simultaneously. (In for example TDMA—(Time Division Multiple Access) systems, the users in contrast thereto are separated through different time slots and frequencies). In a CDMA-system, however, all users use the same frequency and time, and they are only separated by different user specific codes. It is nearly impossible to make the users orthogonal to each other which has as a consequence that the users will interfere. It is therefore important that signals from all users arrive at the base station with approximately the same power. The interference from other users will only be reduced by the spreading factor, which is the number of chips a transmitted data bit is divided into.

In a CDMA-system it is of extreme importance that the transmission power is controlled in an efficient manner. The transmission power of a mobile station is suggested to keep the symbol-to-interference ratio (SIR) at a constant level. If, however, the interference level in the system increases, the transmission power will also be increased, which sometimes is referred to as the cocktail party effect. If a mobile station, which is controlled by a base station, transmits with a transmitting power which interferes another base station, the latter base station runs the risk of being blocked if the level of interference is high. Such blocking is unacceptable for but very short periods of time.

The transmitting power of a mobile station is regulated through measuring the power, received at the base station, and transmitting power control commands back to the mobile station, for example via a control link. This enables the base station to receive all mobiles which are connected to it with approximately the same signal strength. However, since a CDMA-system has a frequency reuse factor of 1, the same frequency is used also in the adjacent base station. Under normal circumstances this is not a problem, since the mobile stations will be connected to the closest base station or rather the base station giving the best quality for uplink as well as for downlink connections. However, sometimes mobile stations are not connected to the "closest" radio base station.

In U.S. Pat. No. 5,430,889 an automatic power control system for a mobile radio system is disclosed in which a control center is provided. Via said control center a plurality of base stations are linked together. Mobile stations are arranged to transmit an identification code unique to each mobile station and a data sequence common to all mobile stations but transmitted by each mobile station at a nominally different time within each burst. Each base station comprises correlator means for discrimination between signals from mobile stations within its own cell and interference signals from mobile stations in adjacent cells. A data logger is provided for storing the results of the correlations so that details of relative power levels in times of reception are recorded. The control center furthermore includes a signal processor responsive to the data logger at each base station for identifying mobile stations involved in potential mutual interference situations and feeding back appropriate instructions to the base stations concerned. A suitable power control signal is then transmitted to such mobile stations. This invention is based on continuous sending of information in order to prevent interference situations from occurring. However, these continuous transmissions in themselves contribute in producing, if not interference, at least noise. Furthermore power is consumed due to the transmission of identification codes and data sequences at all times. Thus, a system as disclosed in U.S. Pat. No. 5,430,889 is not satisfactory because of the above mentioned deficiencies. The system furthermore is quite complex.

SUMMARY

What is needed is therefore a system and a method respectively through which interference can be handled in an efficient way, without consuming power and without in itself producing signalling to such an extent that it might cause disturbances on the system, or even worse, give rise to interference.

Particularly a system and a method respectively are needed through which interference in a cellular communication system using CDMA considerably can be reduced and alleviated. Still further a system and a method respectively are needed through which blocking due to one (or more) interfering mobile station(s) transmitting with a high signal strength is prevented/reduced. Even more particularly a system and a method are needed through which interference problems can be handled when there is a considerable difference in pathloss between uplink and downlink between a base station and a mobile station (or a fixed terminal).

Therefore a system is provided which comprises at least one controlling arrangement which controls a number of base stations each of which serves a number of cells; for reasons of simplicity it is supposed that each base station serves one cell. Each base station controls a number of mobile stations. Each base station is provided with detecting means for detecting interfering signals from a mobile station controlled by another station. The invention thus does not relate to interference produced by mobile stations being controlled by the base station itself.

If a base station detects an interfering signal, an alarm signal is activated. The alarm signal is activated at least if the interference level exceeds a given threshold value. If no threshold value is given, a threshold can be said to be given by the sensitivity of the detecting means themselves.

Means are furthermore provided for ordering identification of all mobile stations in the neighbourhood of the interfered base station (but controlled by other base stations) if an alarm has been given. Means are also provided for establishing by which base station an interfering mobile station is controlled. The base station controlling the interfering mobile station is then ordered to take the appropriate action so as to provide for at least a reduction in the interference level, e.g. to fall below the given threshold value (or any other given threshold value). This can be done in different ways which will be returned to below.

In one embodiment the identification of the mobile stations consists of transmission of an identification signal which is specific for the particular mobile station. It should however be noted that the mobile station does not have to be mobile per se but it can also, for example, comprise a fixed terminal, the essential being that it communicates by radio. The situation may be even more severe if the station does not move, since then a situation of strong interference may remain over a long period of time; if it is a moving mobile station it is more probable that the conditions will change as the mobile station moves. Advantageously each base station comprises identification means for identifying the identification signal from an interfering mobile station.

According to different embodiments the controlling arrangement comprises a separate arrangement provided in the network, or in the system, in any appropriate way. Alternatively the controlling means are provided in an exchange, such as for example a base station controller or a mobile switching center. Which exchange is used depends on the cellular communication system itself and on the particular needs.

In an advantageous embodiment the controlling means, whether provided as separate means or included in an exchange, orders the base stations in the neighbourhood of the disturbed base station, i.e. the base station exposed to interfering signals, to provide for transmission of the identification signals, e.g. emergency codes, relating to the mobile stations which are controlled by said base stations. Advantageously the disturbed base station sends an information signal to the controlling means when it has established which is the interfering mobile station, i.e. at least including the identity of the interfering mobile station.

Advantageously the identification signals, transmitted by the mobile stations, include information about which base stations that control the particular mobile stations. Advantageously a command is sent by the controlling means to the base station controlling the interfering mobile station ordering it to take the appropriate action to reduce or stop interference. Particularly the cellular communication system uses CDMA. The detecting means provided in a base station can be provided for in different ways. In an advantageous embodiment the detecting means comprises a first detector for detecting interfering signals, the strengths of which are so high that the mobile stations controlled by the disturbed base station are actually prevented from being detected or decoded. The detecting means advantageously also comprises second detecting means for detecting interfering signals exceeding a given threshold value.

The identification signals relating to the identities of the mobile stations, which are to be provided on command, in a particular embodiment are produced by a variation in the transmitting power of the mobile station. In that case the identification signal is produced by power control means of the base station through which the transmitting power of the mobile station is modulated.

An identification signal actually to be transmitted from a mobile station can also be provided for in a number of ways.

In an advantageous embodiment at least a number of the mobile stations comprise means for transmitting an identification signal. In one embodiment the mobile stations comprise spreading means for multiplying a "normal" signal by a spreading code. The spread signal then contains, in addition to the "normal" information, the identification information (also denoted emergency message).

In still another embodiment a mobile station may itself be capable of transmitting multiple signals. In that case the identification signal, also called the emergency signal, is transmitted in parallell to the normal transmission. In that way the normal transmission is not affected or disrupted.

As referred to above, the appropriate actions to be taken by the base station controlling an interfering mobile station can be of different kinds. In one embodiment the action is to change the transmission frequency.

In another embodiment transmission is simply stopped. In still another embodiment the transmission power is lowered. In a most advantageous embodiment a so called soft handover is performed. A soft handover is a handover to a number of other base stations so that a mobile station (which as referred to above does not really have to move) is controlled by more than one base station.

Therefore also a method of reducing or handling interference in a cellular communication system, particularly using CDMA, is provided. The method comprises the steps of, in a base station detecting an interfering signal, ordering identification of every mobile station in the neighbourhood of the disturbed base station, identifying the interfering mobile station, and of ordering the base station controlling the interfering mobile station to take an action to at least reduce the interference produced at the disturbed base station.

In an advantageous embodiment controlling means are provided and the method includes the step of informing said controlling means that there are interference problems at a particular base station. Said controlling means then orders identification of each mobile station in the vicinity. The identification of the interfering mobile station is advantageously performed in the interfered base station which in turn informs the controlling means about the identity of the interfering mobile station. Advantageously information about which base station controls the interferer is contained in the information. Alternatively the controlling means keeps information about which base station controls a mobile station.

In one embodiment the method includes the steps of, detecting an interfering signal, the strength of which is so high as to prevent detection of mobile stations controlled by the disturbed base station itself. Alternatively, or in addition thereto, interfering signals having a lower strength but still exceeding a given threshold value are detected. The method in one embodiment comprises a step of modulating the transmitting power of the mobile stations, thus providing the identification signals.

In an alternative embodiment the method includes a step of, in a mobile station, multiplying a normal signal to be transmitted, by a short code, to provide the identification signal.

In still another embodiment the mobile station sends an identification signal in parallell to the normal transmission.

BRIEF DESCRIPTION OF THE DRAWINGS

The invention will in the following be further described, in a non-limiting way, with reference to the accompanying drawings in which.

DETAILED DESCRIPTION

Figure 1:
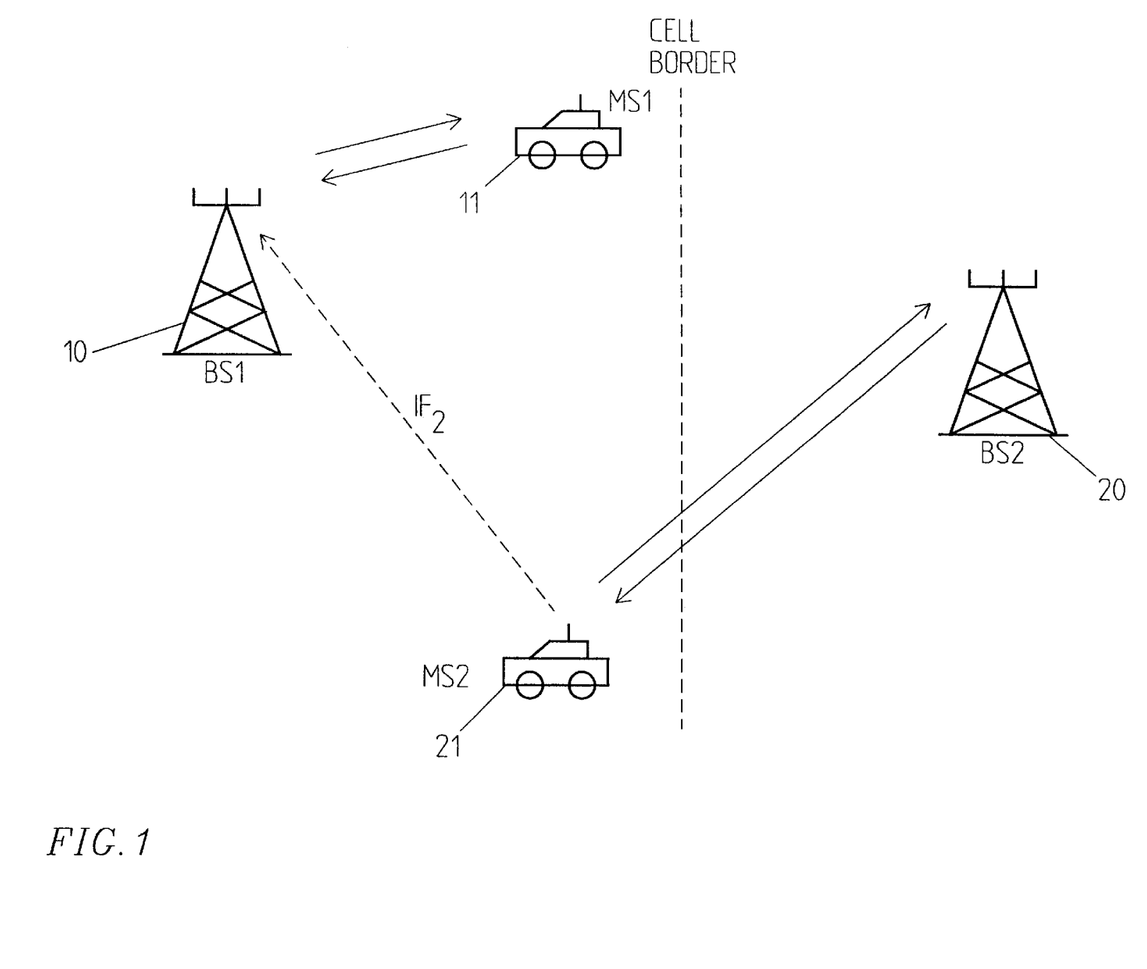
FIG. 1 shows a first example of a mobile station interfering a base station.

In FIG. 1 a part of cellular communication system using CDMA is illustrated. A first base station BS1 10 controls a number of mobile stations MS1 11; for reasons of clarity only one mobile station is actually illustrated. Another mobile station MS2 21 is located in the cell normally served by BS1 10 but here it is instead controlled by BS2 20 located in, or normally serving, another cell. Base stations 10, 20 each comprise power control means for regulating the transmission power of the mobile stations controlled by the respective base station 10, 20. Since MS2 21 in this case is connected to BS2 20, the power control of MS2 21 is operated from BS2 20. In the embodiment of FIG. 1 it is supposed that the transmitting power of MS2 21 is comparatively high and therefore the signals transmitted from MS2 21 interfere with BS1 10 through the interfering signal $IF_2$. A CDMA-system normally transmits with long codes. A long code is a spreading code which is very long, e.g. particularly $2^{41}-1$ bits or more. The reason for that is that in a CDMA-system all users use the same frequency and it is desirable to be able to distinguish as many users from each other as possible. Therefore BS1 10 is not capable of detecting or decoding the signal from MS2 21, at least not without difficulty. Long code and short code are concepts well known within the art of CMDA systems and will therefore not be further evaluated herein.

Figure 2:
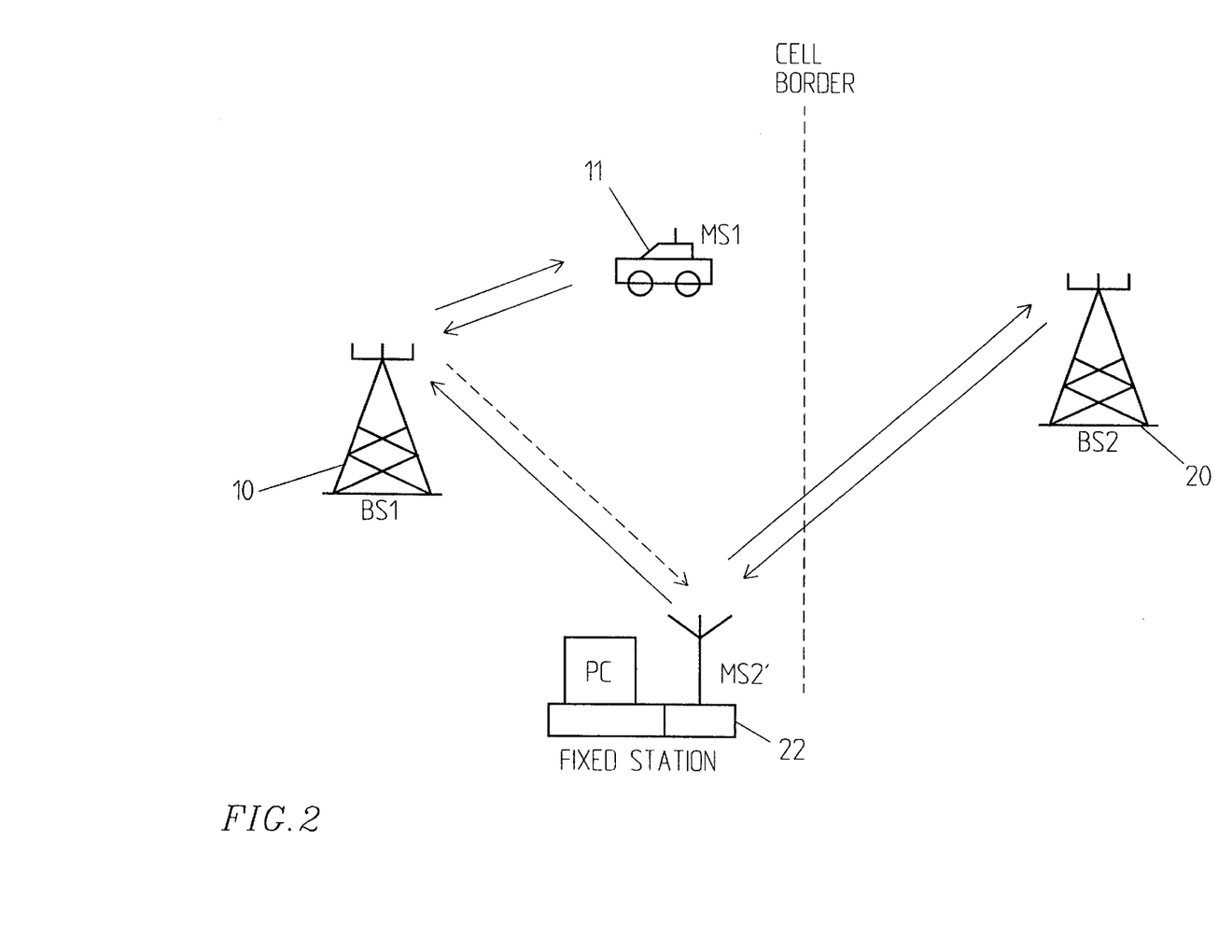
FIG. 2 shows another example in which case a station, which does not move, interferes a base station, FIG. 3 schematically illustrates an example of differences in pathloss, FIG. 4 schematically illustrates the functioning according to one embodiment of the invention.

In FIG. 2 another scenario is illustrated in which a base station BS1 10 is interfered by a station 22 controlled by another base station, BS2 20. As referred to earlier in the application a CDMA-system has a frequency reuse factor of 1. Normally a mobile station is connected to the closest base station or the base station providing the best quality for uplink as well as for downlink connections. However, occasionally there is a considerable difference in pathloss between uplink and downlink. This causes problems in a CDMA-system. In FIG. 2 the reference numerals of FIG. 1 are the same except for the interferer 22 which here does not act as a mobile station but rather as a fixed station, e.g. a PC (personal computer) communicating via radio, e.g. a mobile station MS2' 22. The base stations 10, 20 broadcast pilot signals which are scanned by the mobile stations 11, 22 in order to find out which base station has the highest signal strength. Mobile station MS2' 22 has established that the signal strength from BS2 20 is the strongest. MS2' 22 then connects to BS2 20 and the power control for MS2' 22 will be operated from BS2 20. However, whereas the downlink from BS1 10 to MS2 22 is bad and the uplink from MS2' 22 to BS1 10 is good, there is a big difference in pathloss between uplink and downlink. Since MS2' 22 is controlled by BS2 20, and the uplink to BS1 10 is good, MS2' 22 will act as a strong interferer to BS1 10. Since furthermore MS2' 22 transmits with a long code, BS1 10 cannot detect the signal from MS2' 22.

Figure 3:
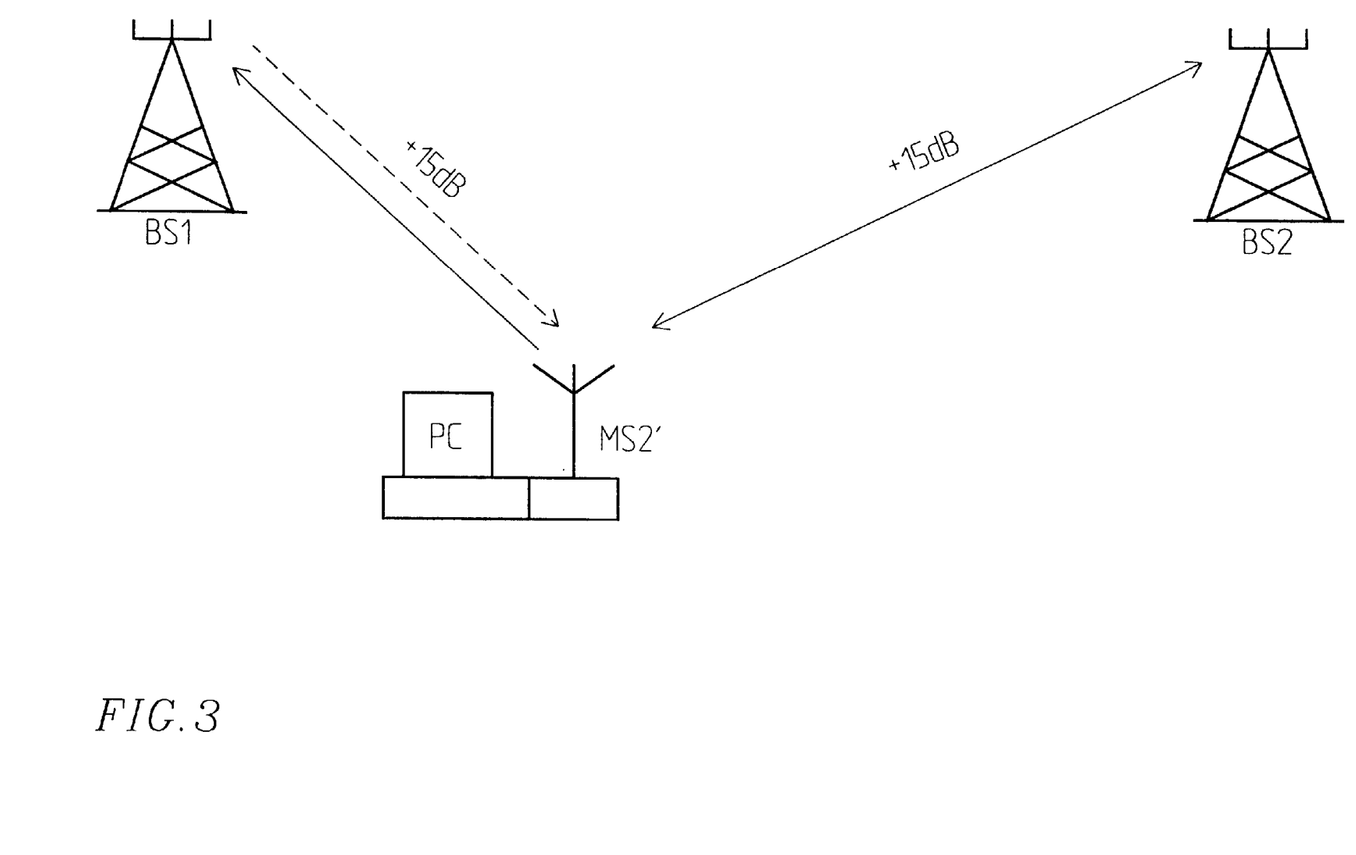

The downlink from BS1 (dashed line) is supposed to suffer from fading giving an additional loss of e.g. 15 dB or more. At a given time BS2 has a pathloss which is 15 dB higher because of the longer distance to MS2'. This is schematically illustrated in FIG. 3. It should however be noted that it does not have to be a fixed station as illustrated in FIG. 3 but it can of course also be a mobile station.

A situation may then arise in which MS2' connects to BS2 instead of to BS1. The transmitting power is then determined by BS2 and it is too high for BS1, i.e. BS1 is interfered by MS2'.

If the fading exceeds the difference in pathloss of BS1 and BS2, the probability that such a situation occurs is about 2%.

FIGS. 1–3 merely show some examples of situations in which interference is produced in a cell by a mobile station which is controlled by a base station in another cell. It should be noted however that a mobile station does not have to be mobile as such; the situation is even worse if it is not mobile, or if it is not moving, since in such a case, for a situation in which a high degree of interference is produced, this situation is more or less permanent as compared to a situation in which a mobile station is moving. In such a case the mobile station shortly could be controlled by the appropriate base station, i.e. the base station controlling the cell in which the mobile station actually is, or in other words, the duration of the interference is limited.

According to the invention, a base station comprises detecting means for detecting interference. Different detecting arrangements can be used and a detection threshold level can be set or alternatively the detector only detects that a base station can not detect or decode its own "mobile stations", i.e. mobile stations controlled thereby and which are located in the cell handled by the base station itself.

Figure 4:
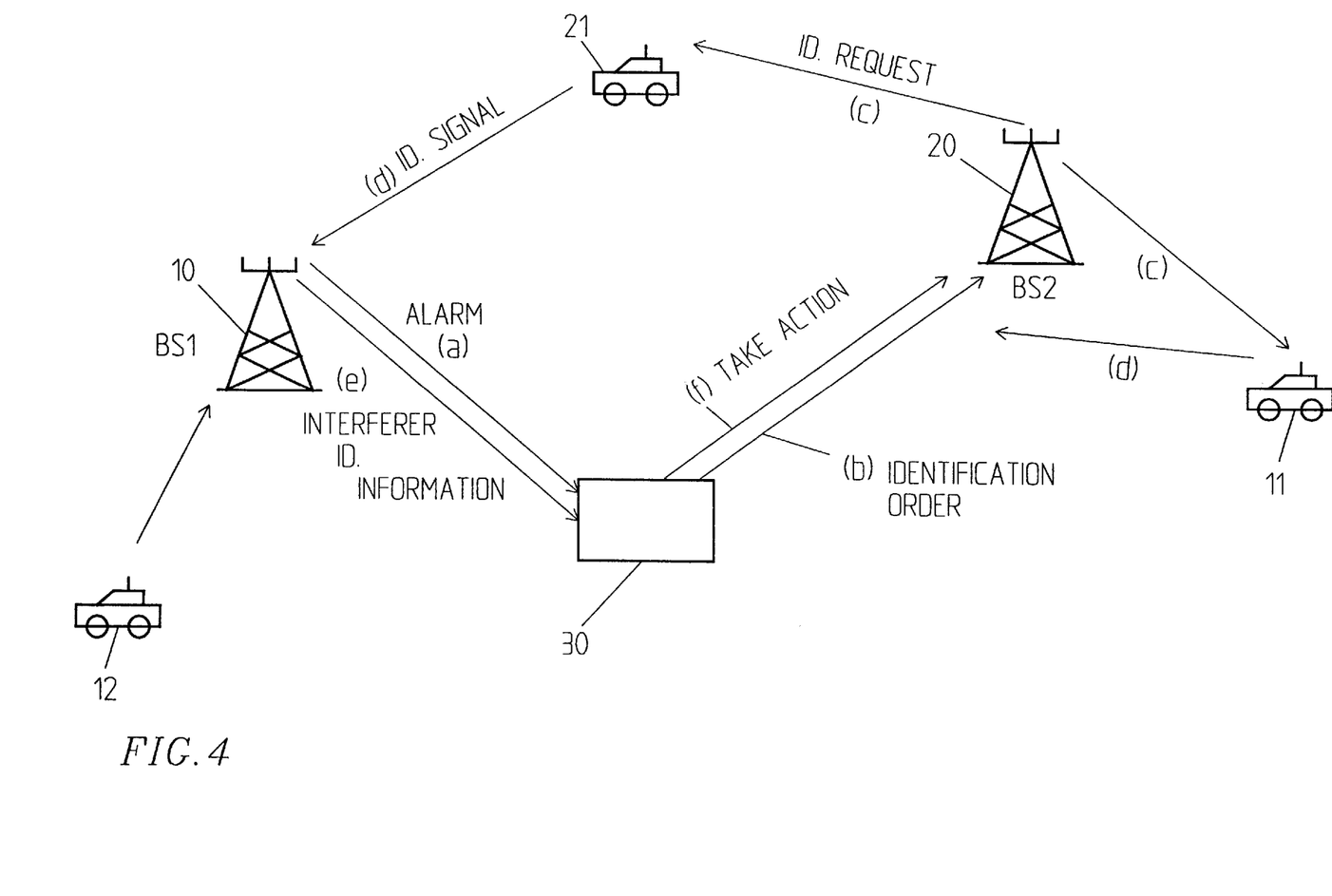

FIG. 4 illustrates a system according to the invention in which a base station 10 detects that it is being interfered. BS1 10, however, does not know which mobile station produces the interfering signals. In this particular case it is supposed that interference is produced by one mobile station. In other cases more than one mobile stations produce interfering signals. According to the invention BS1 transmits an alarm signal (a) to controlling arrangement 30. The controlling arrangement 30 controls a number of base stations, in FIG. 4 only two are shown, but it should be understood that it is not important to the present invention how many base stations are controlled by a controlling arrangement 30. Normally, however, more than two base stations are controlled by one and the same controlling arrangement. The controlling arrangement can be provided in different ways, for example it can be arranged as a separate entity in a network or it can be combined with other functional entities. In one advantageous embodiment the controlling arrangement is implemented in a switching arrangement, for example a base station controller (BSC) or a mobile switching center (MSC) or any other exchange controlling a number of base stations.

The controlling arrangement 30, upon reception of an alarm signal (a) from one of its base stations, here BS1 10, orders identification of all mobile stations connected to other base stations which are close to BS1 10 in such a way that they can be detected by BS1 10. In an advantageous embodiment this is provided for in that the controlling arrangement 30 sends a message comprising an identification order (b) to the base stations which it controls, or particularly only some of the base stations controlled by it, that they should request the mobile stations they are controlling to send identification signals (b). In FIG. 4 the controlling arrangement 30 sends an identification order (b) to BS2 21 to request all the mobile stations controlled by BS2 21, here MS 11, MS 21, to identify themselves. Mobile stations 11, 21 then transmit identification signals (d). Advantageously the identification signal comprises a short code and the identification of the mobile station and advantageously it also contains information about which base station actually controls the mobile station in question. BS1 in this particular case detects an identification signal transmitted by mobile station 21. BS1 10 then sends a message to the controlling arrangement 30 containing the information that mobile station 21 is the interfering mobile station (e). The controlling arrangement 30 then orders BS2 20, which controls mobile station 21, to take the appropriate action (f). Examples of an appropriate action are for example to change frequency, reduce the transmission power, stop the transmission, or, in a particularly advantageous embodiment, to perform a soft handover. A soft handover results in the control of a mobile station being distributed among a number of base stations, in this particular case for example base stations BS1 and BS2. Also other alternatives are possible depending on the particular situation, system and on the needs.

The detecting means provided in the base stations can be of different kinds and various detection algorithms can be implemented. In one embodiment it is merely detected that a base station cannot decode the mobile stations which it controls. This means that an interference level is acceptable as long as the own mobile stations can be detected/decoded.

In another embodiment a threshold value is given and if the interference level exceeds the given threshold value, an alarm signal is activated and transmitted to the controlling arrangement as discussed above.

Figure 5:
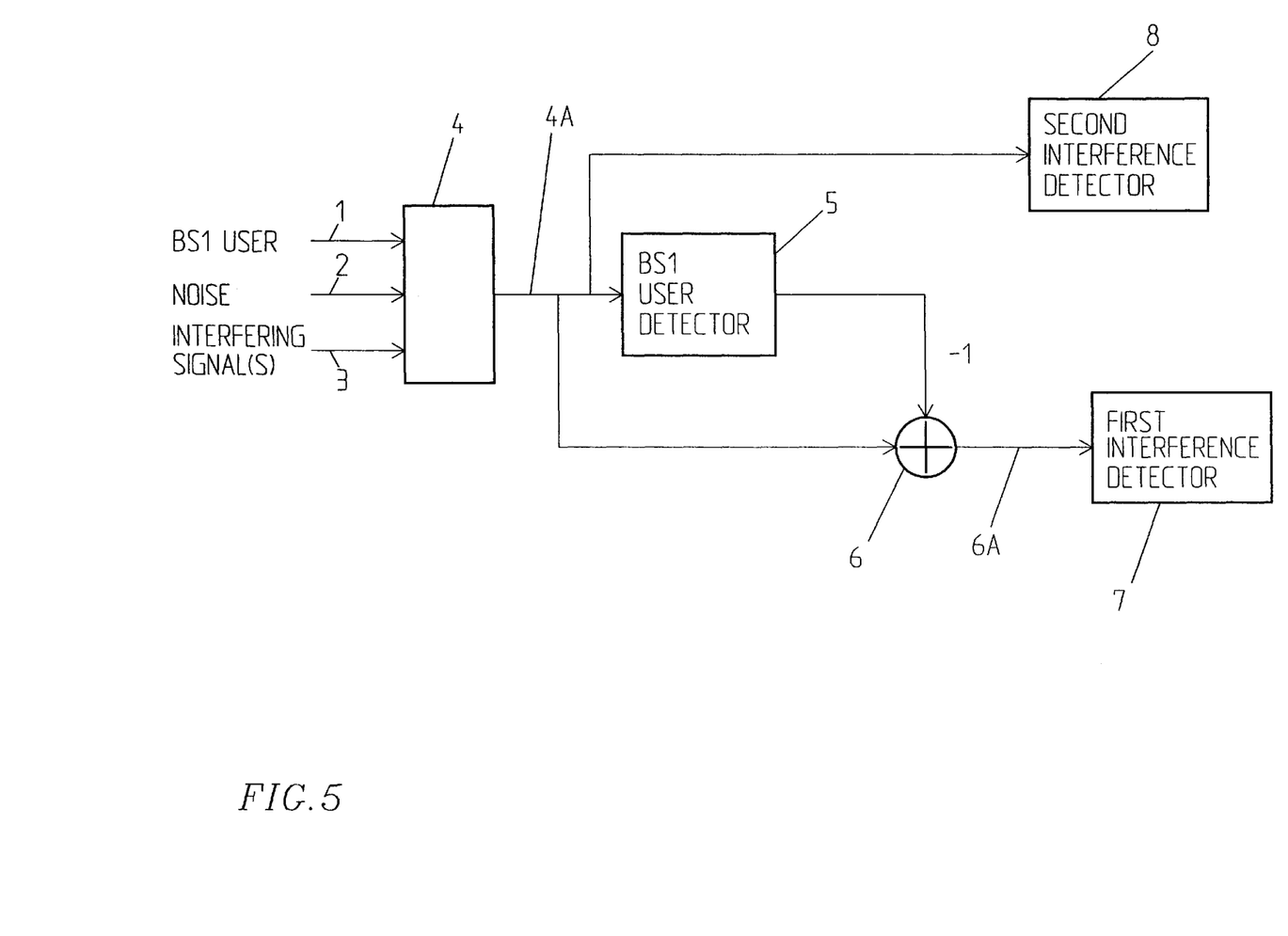
FIG. 5 shows one example of a detecting arrangement used in a mobile station (fixed station) according to the invention, FIG. 6 relates to identification of a mobile station using modulation of the transmit power, FIG. 7 relates to an identification signal according to another embodiment, FIG. 8 relates to an identification signal according to a third embodiment, FIG. 9 in a schematical manner illustrates transmission of identification signals.

Still another embodiment is illustrated in FIG. 5. In this case a detector 5 is implemented called base station user detector and which is used for detecting the users, i.e. the mobile stations controlled by the concerned base station. A first interference detector 7 is also implemented, the purpose of which is to detect an interferer when the base station users still can be detected but the remaining noise level is considered to be too high and a second interference detector 8 is implemented for detecting large interferers, i.e. the interference level is so high that the base station users cannot be detected.

The functioning is as follows: In receiving means 4 the signals from the mobile stations controlled by the base station itself (BS1 users) 1, noise 2, and the interfering signal(s) 3 are received thus comprising a sum signal 4A which is input to the BS1 user detector 5. In adding means 6 the output from the user detector 5 is subtracted from the sum signal 4A (which also was input to the user detector 5) resulting in a signal 6A which is a combination of noise 2 and the interfering signal(s) 3. This signal is input to the first interference detector 7. The interference detector detects interfering signals generated by mobile stations controlled by other base stations and it does not detect interference generated by the users of a base station itself. If the signal comprising noise and interfering signal 6A, exceeds a given threshold value, an alarm signal is transmitted to the controlling arrangement (not shown in FIG. 5). If however, the signal 4A input to the first detector 5 is such that the users of the base station can not be detected, the signal 4A is provided directly to the second interface detector 8 which then activates the transmission of an alarm signal.

Also the identification of an interfering mobile station can be provided for in different ways, of which three will be briefly discussed herein.

Figure 6:
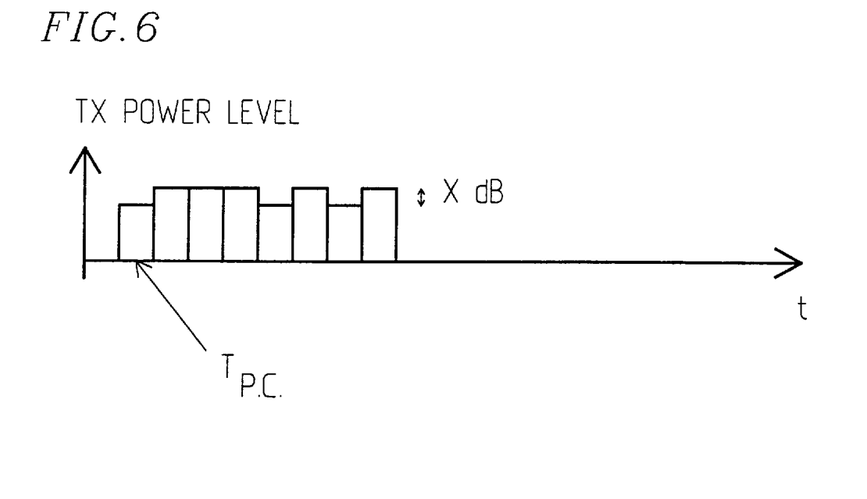

According to one embodiment the identification signal (also called the emergency message) consists in modulation of the transmission power level of the mobile stations. This can also be provided for in different ways. In an advantageous embodiment the base station controlling a mobile station varies the power control commands in an appropriate way so that the interfered base station is able to detect the transmitted data. This is schematically illustrated in FIG. 6, wherein the transmitted data is 01110101 (low=0; 1=high). $T_{P.C.}$ indicates the power control time and x indicates the variation in dB. If an identification signal is provided for in this way, the normal transmission from the mobile station is not interrupted and the performance is merely slightly decreased.

Figure 7:
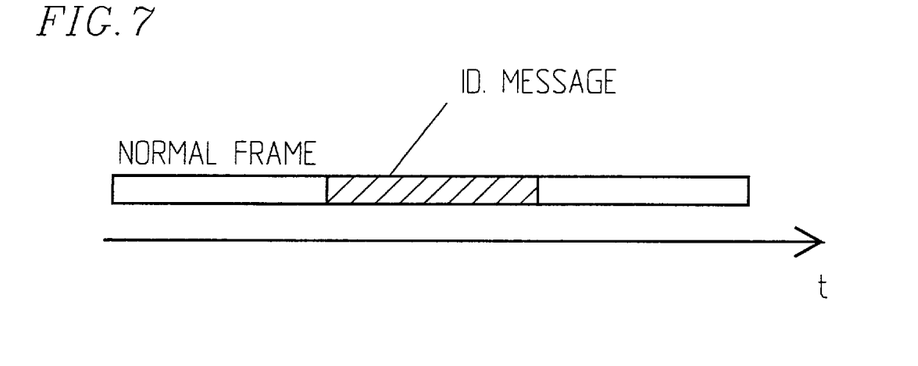

Another way of providing an identification signal from a mobile station is schematically illustrated in FIG. 7. One CDMA frame is here exchanged through an identification signal (emergency message). The emergency message is spread with a known sequence which preferably comprises a short code for synchronization reasons. The emergency message at least includes information about the identity of the mobile station and advantageously also information about the base station controlling it or the so called base station colour code. If thus the interfered base station detects such an emergency message, information is provided to the controlling arrangement, or to the network, which notifies the base station controlling the interfering mobile station, which orders the base station to take the appropriate action as discussed above. In this way however the normal transmission for the mobile station is interrupted.

Figure 8:
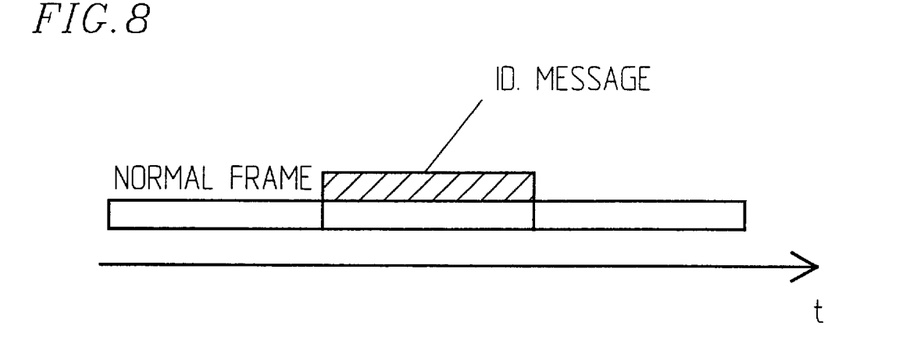

In FIG. 8 still another alternative is shown. The mobile station is here capable of transmitting multiple signals and the emergency message, i.e. the identification signal can be added to the normal transmission and sent in parallell therewith. In this way the normal transmission for the mobile station is not interrupted.

Figure 9:
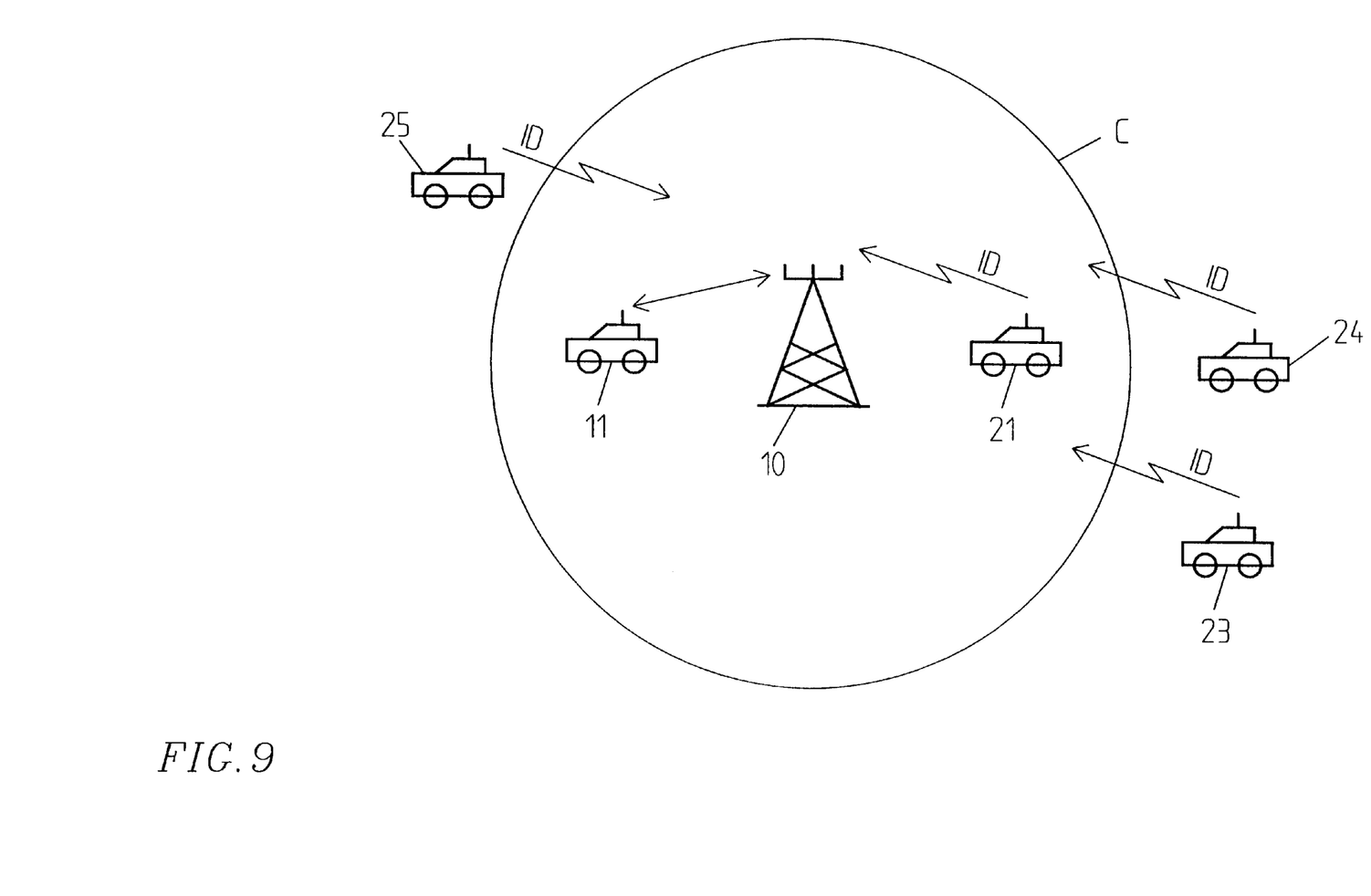

FIG. 9 schematically illustrates the sending of identification signal e.g. spread by a short code. The base station 10 controls cell C. Mobile station 11 is controlled by base station 10 and the transmission is normal. All mobile stations in the neighbourhood of base station 10 have been ordered to transmit an identification signal comprising a short code, in the figure simply denoted ID. The identification signals of mobile stations 23, 24, 25 are very weak when they reach base station 10 because of the long distance to BS 10, i.e. the identification signals for mobile stations 23, 24, 25 are received in BS 10 with a power which is lower than that of the interferer. The mobile stations (not controlled by BS 10) are ordered to send identification signals using the same short code at the same time. This is not a problem in a CDMA system since they can be separated in time. It is also possible to establish the amount of interference produced by each interferer (if there are more than one) through measuring the received power. The power of interference resulting from a mobile station is directly proportional to the received power from that particular mobile station.

Thus, in this case, base station 10 detects and identifies mobile station 21 as being the interferer. Base station 10 then informs the controlling arrangement (not shown here), that mobile station 21 is the interferer.

Figure 10:
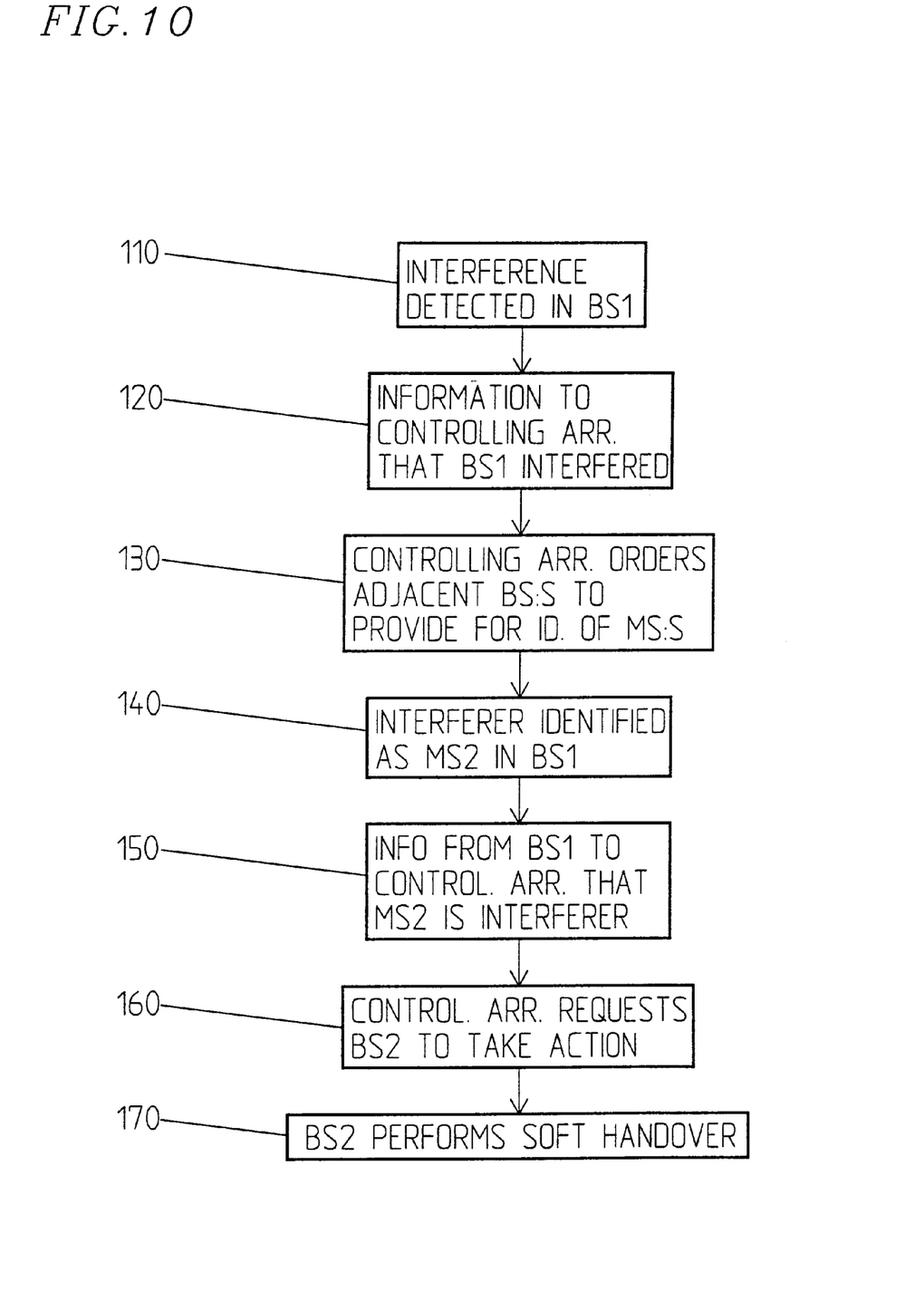
FIG. 10 is a flow diagram describing an embodiment of the present invention.

In FIG. 10 a flow diagram is illustrated. When a base station, here called BS1, detects (an) interfering signal(s), 110, information is sent to a controlling arrangement, e.g. an exchange, that BS1 is interfered, 120. The controlling arrangement then orders the base stations in the vicinity of BS1 to provide for identification of the mobile stations which they control, 130. As discussed above this can be done in different way, e.g. through modulating the transmission power in which case the respective base stations vary the power control commands or it can be achieved through the respective base station requesting the mobile stations controlled by it to transmit identification signals. BS1 then detects the identity of the interfering mobile station, for example MS2, 140. BS1 then informs the controlling arrangement that MS2 is the interfering mobile station, 150. Either the identification signal contains information about which base station controls the interfering mobile station, or the controlling arrangement keeps information about which base stations control which mobile stations. The controlling arrangement then requests the identified base station, e.g. BS2, to take the appropriate action as far as MS2 is concerned, to the reduce or stop interfering BS1, 160. In this particular embodiment BS2 performs a soft handover to provide that MS2 is controlled by both BS1 and BS2, 170.

Then invention is not limited to the shown embodiments, but it can be varied in a number of ways, within the scope of the claims.

What is claimed is:

1. A system for reducing interference in a cellular communication system, said system comprising at least one controlling arrangement communicating with a number of base stations, each base station serving a cell, and a number of mobile stations, controlled by said base stations, wherein each base station comprises detecting means for detecting interfering signals from one or more mobile station(s) controlled by other base station(s), and alarm activating means for activating the transmission of an alarm signal if interference is detected, and the controlling arrangement comprises means for requesting identification of all mobile stations in the neighbourhood of the interfered base station and means for establishing by which base station an interfering mobile station is controlled, the base stations controlling an interfering mobile station taking the appropriate action to reduce the interference level.

2. The system of claim 1,
   wherein all mobile stations in the neighbourhood of the interfered base station are requested to transmit identification signals when interference is detected.

3. The system of claim 2,
   wherein the base stations contain identification means for identifying an interfering mobile station.

4. The system of claim 2,
   wherein at least for a number of mobile stations the identification signal is produced by a variation in the transmitting power of the one or more mobile station.

5. The system of claim 12,
   wherein the identification signal is produced by power control means in the base station through modulating the transmitting power of the one or more mobile station.

6. The system of claim 2,
   wherein at least a number of mobile stations comprise spreading means for signal multiplication by a short code and wherein the identification signals comprise signals spread by said short code, which is common for at least a number of mobile stations, and the identity of the respective mobile station.

7. The system of claim 2,
   wherein at least a number of mobile station are capable of transmitting multiple signals, the identification signal being transmitted in parallell to the normal transmission.

8. The system of claim 2,
   wherein the identification signal comprises information about the identity of the mobile station and about the base station controlling it.

9. The system of claim 1,
   wherein a the alarm signal is transmitted if the interference level exceeds a threshold level.

10. The system of claim 1,
    wherein the controlling arrangement is provided in an exchange a base station controller.

11. The system of claim 1,
    wherein the controlling arrangement is a separate arrangement in the network.

12. The system of claim 1,
    wherein when it has been established in the interfered base station which mobile station is the interfering mobile station, the interfered base station sends an information signal containing information about the interfering mobile station to the controlling means.

13. The system of claim 12,
    wherein the controlling means sends a command to the base station controlling the interfering mobile station ordering it to take the appropriate action to reduce or stop the interfering.

14. The system of claim 1,
    wherein the cellular communication system uses a code division multiple access system.

15. The system of claim 1,
    wherein the detecting means at least comprises detecting means for detecting interfering signals producing an interference level which is such that the mobile stations controlled by the disturbed base station are prevented from being detected.

16. The system of claim 1,
    wherein the detecting means at least comprises detecting means for detecting interfering signals exceeding a given threshold value still allowing detection of mobile stations controlled by the base station itself.

17. The system of claim 1,
    wherein the interfering mobile station is stationary.

18. The system of claim 1,
    wherein the action to reduce the interference level is to stop transmission, to change transmitting frequency, to perform a soft handover or to lower the transmission power.

19. A method of reducing interference in a cellular communication system, particularly a CDMA-system, including a number of base stations and a number of mobile stations, the method comprising the steps of:
    detecting interference in an interfered base station,
    requesting identification of every mobile station in the neighbourhood of the interfered base station not controlled by the interfered base station,
    identifying the interfering mobile station(s),
    ordering the base station(s) controlling the interfering mobile station(s) to take an action to at least reduce the interference level.

20. The method of claim 19, further including the steps of:
    informing controlling means controlling a number of base stations that a base station is interfered,
    providing from said controlling means the transmission of identification signals from the mobile stations,
    identifying which is/are the interfering mobile station(s) in the interfered base station,
    informing the controlling means about which mobile station(s) is/are the interfering mobile station(s).

21. The method of claim 20,
    wherein the controlling means are provided in an exchange.

22. The method of claim 19, further comprising the steps of:

detecting an interfering signal which produces an interference level which is so high as to prevent detection of mobile stations controlled by the interfered base station, and detecting interfering signals producing an interference level which is lower, but exceeds a given threshold value.

23. The method of claim 19, further comprising the step of:

modulating the transmitting power of the mobile stations to provide identification signals.

24. The method of claim 19, further comprising the step of:

multiplying the identification signal by a short code in a mobile station.

25. The method of claim 19, further comprising the step of:

transmitting an identification signal in parallell to the normal transmission from at least a number of mobile stations.

26. The method of claim 24, further comprising the step of:

transmitting an identification signal in parallell to the normal transmission from at least a number of mobile stations.

* * * * *